(12) United States Patent  (10) Patent No.: US 7,796,850 B2
Jewell et al.  (45) Date of Patent: Sep. 14, 2010

(54) MULTIPLE-PATHWAY OPTICAL TRANSMITTER

(75) Inventors: Jack L. Jewell, Boulder, CO (US); Luke A. Graham, Louisville, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/137,252

(22) Filed: Jun. 11, 2008

(65) Prior Publication Data

US 2009/0310915 A1 Dec. 17, 2009

(51) Int. Cl.
 *G02B 6/32* (2006.01)
 *G02B 6/36* (2006.01)
(52) U.S. Cl. .......................................... 385/33; 385/88
(58) Field of Classification Search ................ 385/33
 See application file for complete search history.

(56) References Cited

U.S. PATENT DOCUMENTS

| 6,496,621 | B1 | 12/2002 | Koehler et al. | |
| 6,512,868 | B1 * | 1/2003 | Foster et al. | 385/33 |
| 6,530,697 | B1 | 3/2003 | Johnson et al. | |
| 6,600,845 | B1 | 7/2003 | Feldman et al. | |
| 6,931,181 | B2 * | 8/2005 | Jewell et al. | 385/49 |
| 2004/0091218 | A1 * | 5/2004 | Haasteren | 385/93 |

* cited by examiner

*Primary Examiner*—Uyen-Chau N Le
*Assistant Examiner*—Kajli Prince
(74) *Attorney, Agent, or Firm*—Matthew A. Pequignot; Pequignot + Myers LLC

(57) ABSTRACT

Optical systems comprise one or more optical pathways including lenses that are offset with respect to each other and lenses that are offset with respect to optical fibers.

16 Claims, 6 Drawing Sheets

MULTIPLE-PATHWAY OPTICAL TRANSMITTER

BACKGROUND

1. Field of the Invention

The present invention relates generally to optical transmitters.

2. Related Art

One of the problems in fiber communications is that optical feedback, typically from the fiber to the laser, affects the laser operation and gives rise to jitter in the timing of the rising and falling edges of the signal. The effects of the feedback are most severe with single-mode lasers, e.g. 1310 nm VCSELs or DFB lasers, but it is also significant with multi-mode lasers, e.g. 850 nm VCSELs or Fabry-Perot (FP) lasers. Therefore, there exists a need for a way to reduce feedback for single-mode lasers and multi-mode lasers.

SUMMARY

According to a first broad aspect of the present invention, there is provided a system comprising: one or more optical pathways, each optical pathway comprising: a first lens having a first lens axis; a second lens having a second lens axis that is offset with respect to the first lens axis by a lateral distance that is greater than the combined manufacturing tolerance of the first lens and the second lens; and an optical fiber having a fiber axis.

According to a second broad aspect of the present invention, there is provided a system comprising: one or more optical pathways, each optical pathway comprising: a first lens having a first lens axis; and an optical fiber having a fiber axis that is offset with respect to the first lens axis by a lateral distance that is greater than the combined manufacturing tolerance of the first lens and the optical fiber.

According to a third broad aspect of the present invention, there is provided a system comprising: one or more optical pathways, each optical pathway comprising: a first lens having a first lens axis; a second lens having a second lens axis that is offset by a lateral distance greater than 2 µm with respect to the first lens axis; and an optical fiber having a fiber axis.

According to a fourth broad aspect of the present invention, there is provided a system comprising: one or more optical pathways, each optical pathway comprising: a first lens having a first lens axis; and an optical fiber having a fiber axis that is offset by a lateral distance greater than 2 µm with respect to the first lens axis.

According to a fifth broad aspect of the present invention, there is provided a system comprising: two or more optical pathways, each optical pathway comprising: a first lens having a first lens axis; a second lens having a second lens axis that is offset with respect to the first lens axis by a lateral distance that is greater than the combined manufacturing tolerance of the first lens and the second lens; an optical fiber having a fiber axis; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 50 µm apart from each other.

According to a sixth broad aspect of the present invention, there is provided a system comprising: two or more optical pathways, each optical pathway comprising: a first lens having a first lens axis; a second lens having a second lens axis that is offset by a lateral distance greater than 2 µm with respect to the first lens axis; an optical fiber having a fiber axis; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 50 µm apart from each other.

According to a seventh broad aspect of the present invention, there is provided a system comprising: two or more optical pathways, each optical pathway comprising: a first lens having a first lens axis; a second lens having a second lens axis; an optical fiber having a fiber axis that is offset with respect to the first lens axis by a lateral distance that is greater than the combined manufacturing tolerances of the first lens, the second lens and the optical fiber; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 50 µm apart from each other.

According to an eighth broad aspect of the present invention, there is provided a system comprising: two or more optical pathways, each optical pathway comprising: a first lens having a first lens axis; a second lens having a second lens axis; an optical fiber having a fiber axis that is offset by a lateral distance greater than 2 µm with respect to the first lens axis; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 50 µm apart from each other.

According to a ninth broad aspect of the present invention, there is provided a system comprising: two or more optical pathways, each optical pathway comprising: a first lens; a second lens; an optical fiber; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 20 µm apart from each other.

According to a tenth broad aspect of the present invention, there is provided a system comprising: two or more optical pathways, each optical pathway comprising: a first lens; a second lens; an optical fiber; and two or more VCSELs for emitting light through respective optical pathways of the two or more optical pathways, wherein one or more of the VCSELs emits a lowest-order mode and one or more higher-order modes, and wherein the lowest-order mode and a higher-order mode focus at least 50 µm apart from each other.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, the term "unibody" refers to a device that is constructed of one primary element, as opposed to two or more elements assembled, or removably connected.

For the purposes of the present invention, the term "constructed integrally" refers to a device that has been constructed to include multiple parts having various functions, where the multiple pieces may not be separated from the remainder of the device without damaging the device.

For the purposes of the present invention, the term "diffractive element" refers to an element that decomposes a light beam into sub-beams to redirect the light into directions corresponding to constructive interference between the sub-beams, wherein each of the sub-beams has a phase difference of an integral number of wavelengths not equal to zero. A diffractive element typically comprises a large number of sub-elements that each has a width on the order of an optical wavelength of the light diffracted by the element. A diffractive element may be composed of multiple diffractive elements. Examples of diffractive elements are described in U.S. Pat. Nos. 6,530,697; 6,496,621; and 6,600,845, the entire contents and disclosures of which are hereby incorporated by reference.

For the purposes of the present invention, the term "refractive element" refers to an element that does not decompose a light beam, but after the light beam passes through the refractive element all of the portions the light beam have substantially zero phase difference. An element may act as a refractive element due to: the shape of the refractive element, the angle at which a light strikes the refractive element, variation in the refractive index of the refractive element, etc. A refractive element may be composed of multiple refractive elements.

Figure 7:
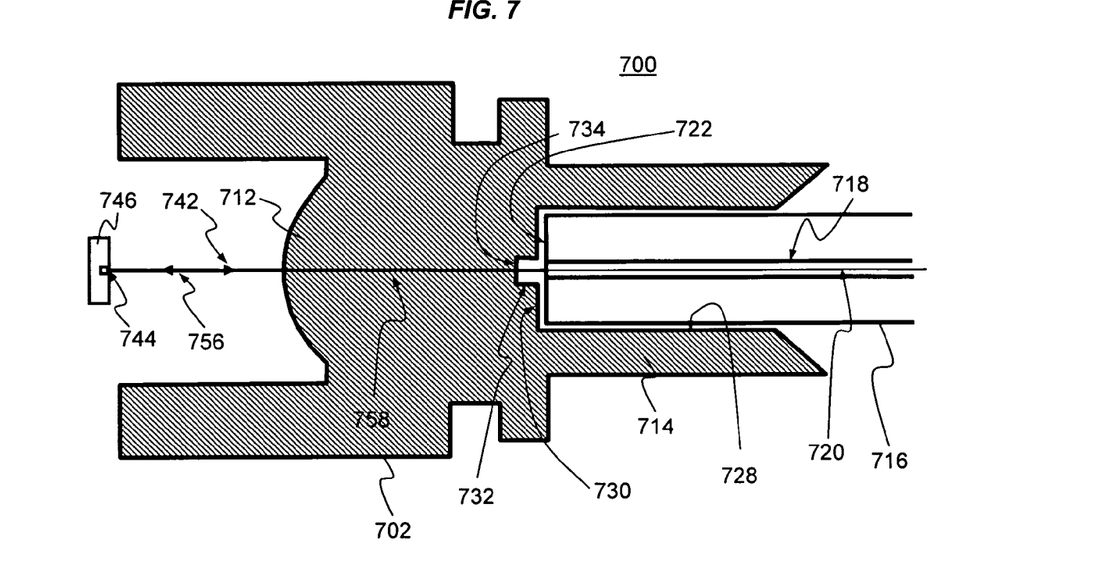
FIG. 7 is a schematic cross-sectional view of an optical system including an aligned OSA.

For the purposes of the present invention, the term "axial alignment" refers to two or more items that all lie along the axis of at least one of the items to permit light to pass through each of the items. For example, FIG. 7 illustrates an example of a TOSA in which the VCSEL, lens, barrel receptacle and optical fiber are in axial alignment along the long axis of the barrel receptacle. Two items that are in axial alignment are "coaxial."

For the purposes of the present invention, the term "laser end" or "proximal end" refers to end of an optical subassembly where a laser is located.

For the purposes of the present invention, the term "fiber end" or "distal end" refers to the end of an optical subassembly where a fiber is inserted into the sub-assembly or where a fiber may be inserted into the sub-assembly.

For the purposes of the present invention, the term "lowest-order transverse mode" refers to the beam emitting from the central portion of the VCSEL aperture, usually originating from a single region in the aperture and usually having a relatively small divergence angle.

For the purposes of the present invention, the term "higher-order transverse mode" refers to any beam emitting from a non-central portion of the VCSEL aperture, usually originating from multiple regions in the aperture and usually having a divergence angle larger than that of the lowest-order transverse mode.

For the purposes of the present invention, the term "radial" refers to a direction either toward or away from the center an optical aperture.

For the purposes of the present invention, the term "azimuthal" refers to a direction oriented at a right angle to a radius from the center of an optical aperture.

For the purpose of the present invention, the term "chordial" refers to a direction along any chord of an optical aperture i.e. a direction that is non-radial. A purely azimuthal direction is a chordial direction that has no radial component.

For the purposes of the present invention, the term "optical scattering" refers to the deflection of light from the path it would follow if the refractive index were uniform or gradually graded. Scattering is caused primarily by microscopic or submicroscopic fluctuations in the refractive index or surface.

DESCRIPTION

It has been found experimentally, with parallel optical modules, that misalignment can reduce the effects of feedback with multi-mode 850 nm VCSEL arrays. The effect of misalignment is that the misaligned beam is incident on the fiber at an angle. In fact, intentionally tilting the VCSEL array produces a similar reduction of feedback effects. For an idealized optical system, the reflected light beam should propagate directly back to the VCSEL aperture. Non-ideal systems, e.g. those using a ball lens or other non-ideal lens, may have the beam distorted on the return, which may reduce feedback effects, but only slightly. For a multi-mode VCSEL in a misaligned system or one with the tilted VCSEL, the effects of feedback may be reduced since the reflected light beam incident on the VCSEL will be at a different angle from the emitted light beam.

An objective of the present invention is to produce an optical sub-assembly (OSA) in which the effects of optical feedback are reduced. In a manufacturing environment, it is undesirable to have misalignment or tilting of the laser source. It is therefore a further objective of present invention to provide an optical sub-assembly in which the laser, e.g. VCSEL, does not need to be tilted, and in which misalignment is minimized. It is yet another objective of the present invention to produce and OSA in which the effective modal bandwidth of a multi-mode fiber is improved.

Figure 1:
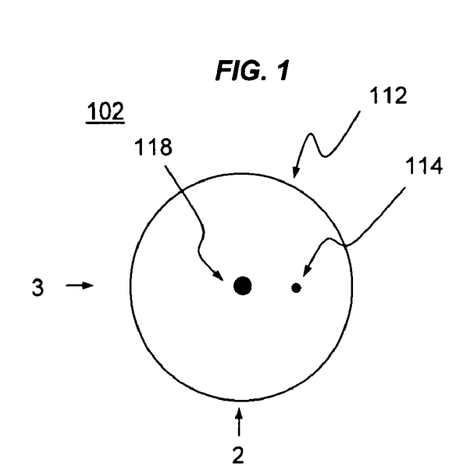
FIG. 1 is a schematic view of an offset launch of light into a multi-mode fiber looking down the fiber core.
Figure 2:
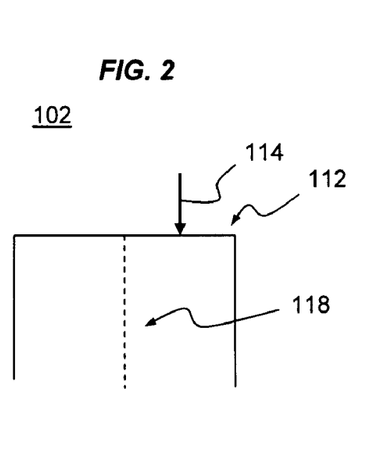
FIG. 2 is a schematic side view of the offset launch of FIG. 1 taken in the direction of arrow 2 of FIG. 1.
Figure 3:
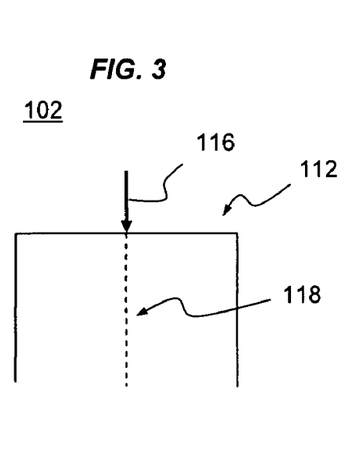
FIG. 3 is a schematic side view of the offset launch of FIG. 1 taken in the direction of arrow 3 of FIG. 1.

Feedback effects may be decreased and the effective modal bandwidth (MBW) may be increased by an optimized launch condition. In Gigabit Ethernet, even the 500 MHz-km MBW is achieved by an "offset launch" in which light from a single-mode fiber is coupled into a 62.5 μm diameter MMF fiber offset by ~23 μm from the center. Such an offset launch 102 is shown in FIGS. 1, 2, and 3 showing a fiber core 112 into which is launched a light beam 114 that is offset from optical axis 118 of fiber core 112. FIGS. 1, 2 and 3 show three views of launch 102: looking down fiber core 102 (FIG. 1), looking at the side of fiber core 112 (FIG. 2, the direction of arrow 2 of FIG. 1), and looking at the side of fiber core 112 from an angle 90° rotated from the view of FIG. 2 (FIG. 3, the direction of arrow 3 of FIG. 1). This launches the light away from the innermost and outermost modes, but after propagating some distance in the fiber, the light may redistribute and couple into some of the undesired modes, particularly the innermost modes.

Figure 4:
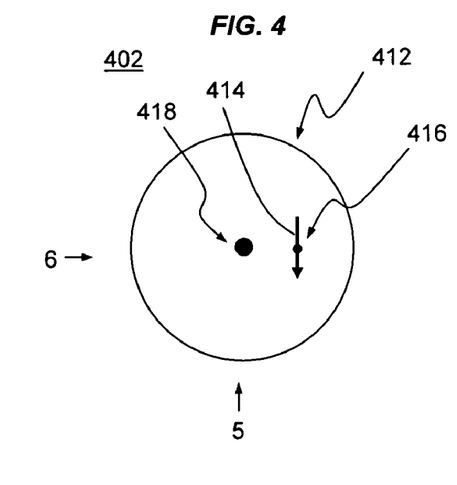
FIG. 4 is a schematic view of an offset launch of light into a multi-mode fiber looking down the fiber core.
Figure 5:
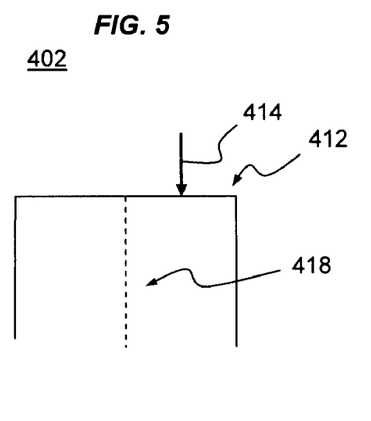
FIG. 5 is a schematic side view of the offset launch of FIG. 1 taken in the direction of arrow 5 of FIG. 4.
Figure 6:
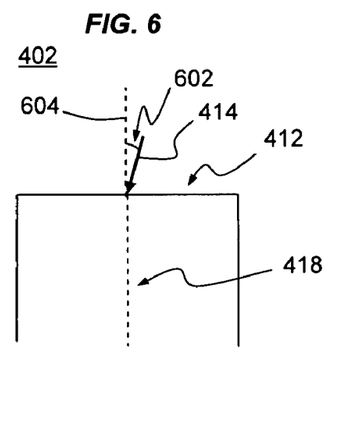
FIG. 6 is a schematic side view of the offset launch of FIG. 1 taken in the direction of arrow 6 of FIG. 4.

The effective MBW may be further improved by introducing an azimuthal angle to the launch into the fiber, for example an angle between 1 and 10 degrees. Such an angled offset launch 402 is shown in FIGS. 4, 5, and 6 showing a fiber core 412 into which is launched a light beam 414 that enters fiber core 412 at a point 416 offset from optical axis 418 of fiber core 412. As shown in FIG. 6, light beam 414 is launched into fiber core 412 at an angle 602 to a vertical line 604 extending from optical axis 418. Together FIGS. 4, 5 and 6 show three views of launch 402: looking down fiber core 412 (FIG. 4), looking at the side of fiber core 412 (FIG. 5, the direction of arrow 5 of FIG. 1), and looking at the side of fiber core 414 from an angle 90° rotated from the view of FIG. 5 (FIG. 6, the direction of arrow 6 of FIG. 1).

The azimuthal angular component to the launch shown in FIGS. 4, 5 and 6 minimizes the coupling into the innermost modes, since the light tends to propagate in a spiral pattern down the fiber. The "offset azimuthal launch" may be accomplished by 1) introducing the azimuthal angle into the optical subassembly; 2) aligning to a single-mode fiber; 3) laterally translating the laser by a distance which produces the desired lateral offset; and 4) setting the components in place. The angular incidence of the beam onto the fiber will reduce the effects of the reflected light beam on the VCSEL, especially if it is a multi-mode VCSEL. Tilting the VCSEL will cause the beam incident on the fiber to be at an angle. If the displacement is in a direction orthogonal to the plane defined by the beam and the optical axis of the fiber, then the angle will be in an azimuthal orientation.

FIG. 7 shows an example of an optical system 700 including an aligned OSA 702 including a lens 712 and a fiber receptacle 714 for receiving an optical fiber 716 having a fiber core 718, a fiber axis 720, and a flat fiber distal end 722. Fiber receptacle 714 has a cylindrical interior surface 728 having an interior surface distal end 730 that includes a cylindrical recess 732 having a straight lens rear surface 734, which may be optically flat, concave, convex, faceted, or any other shape. An emitted light beam, indicated by right-pointing arrowhead 742, is emitted from an aperture 744 of a flat mounted VCSEL 746, travels through lens 712 and becomes incident on fiber distal end 722 at fiber axis 720. A portion of the emitted light beam is reflected by fiber distal end 722 as a reflected light beam, indicated by left-pointing arrowhead 756, and is returned straight back, along optical axis 758, into an aperture 744 of VCSEL 746. Optical fiber 714 includes a flat distal end 722 that reflects the emitted light beam. Lens rear surface 734 is considered "straight" because lens rear surface 734 is perpendicular to fiber axis 720 and optical axis 758 that extends along fiber axis 720.

In FIG. 7, the reflected light beam may enter the VCSEL aperture and interfere with the light being generated by the VCSEL, with constructive and destructive interference varying rapidly, thereby causing intensity fluctuations in the emitted light beam, which gives rise to noise and jitter in the signal.

Figure 8A:
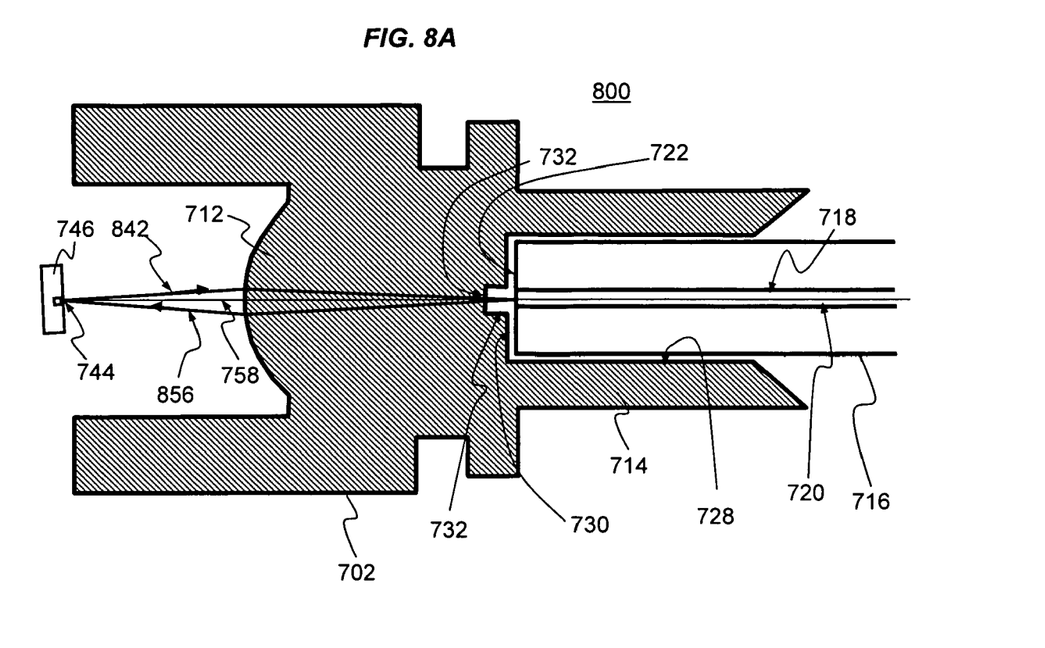
FIG. 8A is a schematic cross-sectional view of the optical system with a VCSEL tilted to form an angled emitted light beam and angled reflected light beam.
Figure 8B:
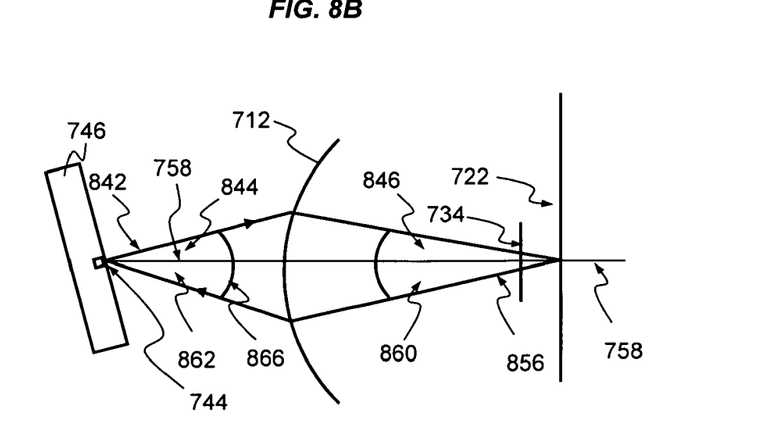
FIG. 8B shows the path of the emitted light beam and reflected light beam of the optical system of FIG. 8A, with proportions of the features of the system altered to better show the angular paths of the emitted and reflected light beams.

FIGS. 8A and 8B show the effect of tilting the VCSEL 746 of FIG. 7. In optical system 800, an emitted light beam 842 propagates at an angle 844 with respect to optical axis 758. Emitted light beam 842 is refracted by lens 712 to make an angle 846 with optical axis 758 and becomes incident on fiber distal end 722 at fiber axis 720. A portion of emitted light beam 842 is reflected by fiber distal end 722 to form reflected light beam 856. Reflected light beam 856 is reflected at an angle 860 with respect to optical axis 758. Reflected light beam 856 is refracted by lens 712 so that reflected light beam 856 enters the aperture (not shown) of VCSEL 746 at an angle 862 with respect to optical axis 758. Reflected light beam 856 is incident on VCSEL aperture 744 at a relative angle 866 (the sum of angles 844 and 862) that is two times angle 844, the tilt angle of VCSEL 746.

In a system such as shown in FIGS. 8A and 8B, the reflected light beam may be degraded relative to the emitted light beam due to the double pass through the lens system. The angle between the emitted and reflected beams produces variation in the constructive and destructive interferences, thereby decreasing the overall intensity fluctuations. A lens system having some aberrations is also likely to result in less feedback than a perfect lens. Also, as mentioned earlier, tilting of components is undesirable in a manufacturing environment. Ways of producing a variety of improved optical systems will now be described.

Figure 9A:
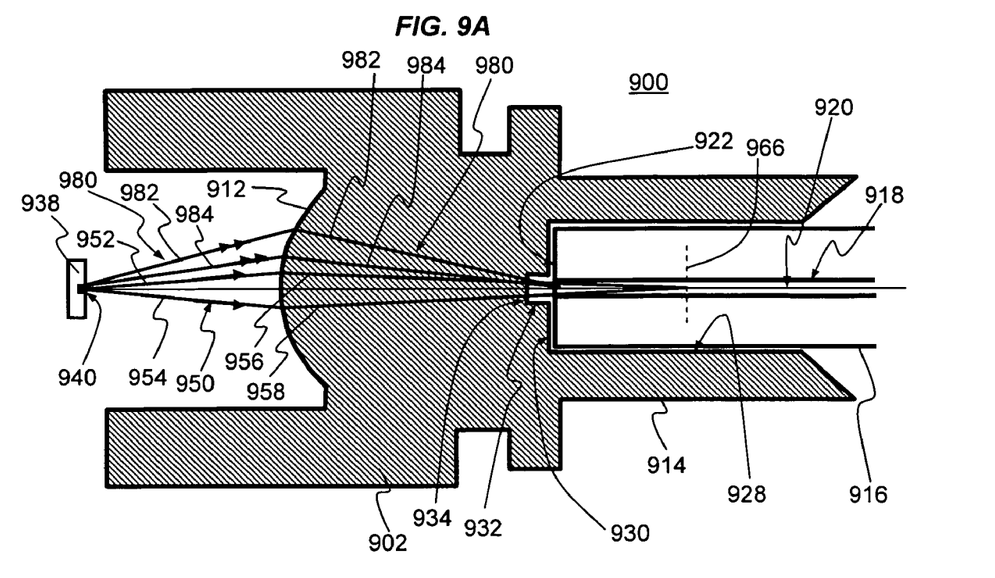
FIG. 9A is a schematic cross-sectional view of an optical system with a VCSEL and an OSA focusing two different modes at different locations according to one embodiment of the present invention.
Figure 9B:
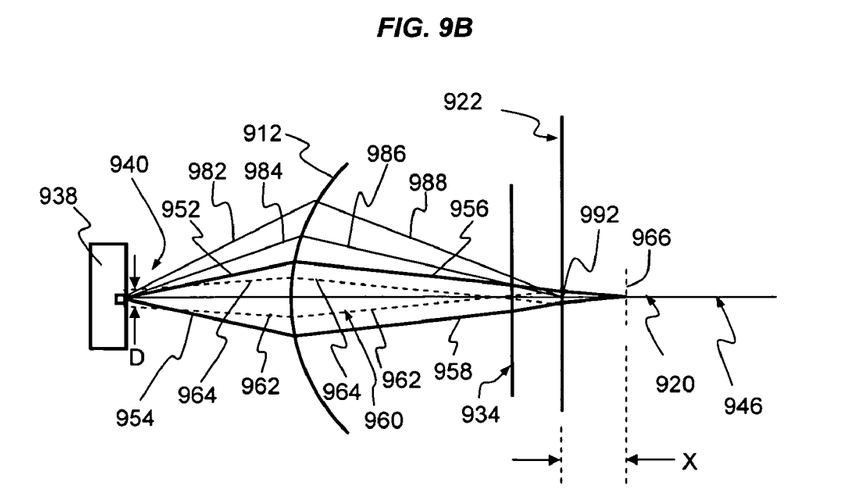
FIG. 9B shows the path of the emitted light beam and reflected light beam for the lowest order mode of the optical system of FIG. 9A, and the emitted light beam from a higher order mode, with proportions of the features of the system altered to better show the angular paths of the emitted and reflected light beams.

FIGS. 9A and 9B show an optical system 900 including an OSA barrel 902 including a lens 912 and a fiber receptacle 914 for receiving an optical fiber 916 having a fiber core 918, a fiber axis 920, and a flat fiber distal end 922. Fiber receptacle 914 has a cylindrical interior surface 928 having an interior surface distal end 930 that includes a cylindrical recess 932 having a lens rear surface 934. VCSEL 938 is mounted flat and has an aperture 940 that is approximately centered with respect to fiber axis 920 and optical axis 946. An emitted light beam 950 from a fundamental or lowest-order mode is represented by rays 952 and 954 from aperture 940 of VCSEL 938 which diverge until emitted light beam 950 is refracted by lens 912 to converge as represented by rays 956 and 958. Then, emitted light beam 950 is refracted by lens rear surface 934 along a slightly more convergent path until emitted light beam 950 is incident on flat fiber distal end 922. As shown, emitted light beam is not focused on flat fiber distal end 922, but is focused inside fiber core 918 at plane 966 at focus position 968. A portion of emitted light beam 952 is then reflected from fiber distal end 922 as reflected light beam 960, represented by light rays 962 and 964. Reflected light beam 960 is refracted by lens rear surface 934 and by lens front surface 912. Reflected light beam 960 is then incident on the aperture 940 of VCSEL 938. Due to the defocusing of emitted light beam 950 on flat fiber distal end 922, reflected light beam 960 is even more defocused on aperture 940 and is shown in FIG. 9B to have a diameter D which is much larger than the diameter of aperture 940. Thus, most of reflected light beam 960 does not enter aperture 940, and the effects of optical feedback are reduced.

An emitted light beam 980 from a higher-order mode is represented by rays 982 and 984 from aperture 940 of VCSEL 938 which diverge until emitted light beam 980 is refracted by lens 912 to converge as represented by rays 986 and 988. Then, emitted light beam 980 is refracted by lens rear surface 934 along a slightly more convergent path until emitted light beam 980 is incident on flat fiber distal end 922 at fiber axis 920. As shown, the emitted light beam from the higher-order mode is approximately focused on flat fiber distal end 922. A portion of emitted light beam 980 is then reflected from fiber distal end 922. Although not shown, the reflection of emitted light beam 980 of a higher-order mode is refracted by lens rear surface 934 and by lens front surface 912. Reflected light from emitted light beam 980 is then incident on the aperture 940 of VCSEL 938. VCSEL 938 is not as sensitive to reflections from a higher-order mode as it is from the lowest-order mode. The distance X, shown in FIG. 9B is defined as the distance between the focus position 968 of the lowest-order transverse mode and a focus position 992 of a higher-order transverse mode.

In the optical system shown in FIGS. 9A and 9B, aberrations from the light beam pathways shown may be due to aberrations in the lens design and/or alignment between the components of the system. A spherically shaped lens 912 qualitatively produces the focusing characteristics shown in FIGS. 9A and 9B, which may reduce the feedback effects though perhaps not optimally. While spherically-shaped ball lenses were used in the past for VCSEL OSAs and are often used for single-mode OSAs, molded-plastic TOSAs such as the OSA shown in FIG. 9A employ aspherical surfaces which focus all rays from the emitted beam in approximately the same plane. Without the present inventive concept, it would be counter-intuitive for one skilled in the art to design an OSA deliberately with aberrations or even a spherical surface when it is straightforward to manufacture an "improved" aspherical surface. In U.S. Pat. No. 5,319,496, Jewell et al., the entire contents and disclosure of which is hereby incorporated by reference, describes the use of aberrations to focus multiple VCSEL modes onto a smaller spot area. The present invention is opposite in nature in that the multiple modes are deliberately focused at different locations. The application and characteristics of the present invention differ greatly from that of U.S. Pat. No. 5,319,496. Some advantageous characteristics of an OSA of the present invention, such as the OSA of FIG. 9A, to be advantageous are: 1) the coupling efficiency into the fiber of the lowest-order mode is most tolerant to misalignment, e.g. defocus or displacement; 2) the VCSEL is most sensitive to feedback from the lowest-order mode. An OSA of the present invention may reduce the effects of feedback without sacrificing coupling efficiency.

Although in the embodiment shown in FIGS. 9A and 9B in which the focus position of the lowest-order transverse mode is inside the fiber, in another embodiment the focus position of the lowest-order transverse mode may be outside the fiber and/or the focus position of a higher-order transverse mode may be inside or outside the fiber.

In one embodiment, the present invention provides an OSA in which the distance between the focus point for the lowest-order transverse mode and for a higher-order transverse mode is 20 µm or more. In another embodiment, the present invention provides an OSA in which the distance between the focus point for the lowest-order transverse mode and for a higher-order transverse mode is 50 µm, or more. One property of a lens that may cause the distance between the lowest-order transverse mode focus point and a higher-order transverse mode focus point to be significant is spherical aberration. Normally lenses are designed to have minimal spherical aberration, for example less than one quarter wave. In one embodiment the present invention employs an OSA with a lens having more than one half wave of spherical aberration.

Although the lens rear surface in the embodiment of the present invention shown in FIGS. 9A and 9B is optically flat, the lens rear surface may be concave, convex, faceted, or any other shape, such as the lens rear surface shapes described and shown in U.S. patent application Ser. No. 12/042,062 to Jewell et al. entitled "Low-Noise Optical Transmitter," filed Mar. 4, 2008, the entire contents and disclosure of which is hereby incorporated by reference.

Figure 10:
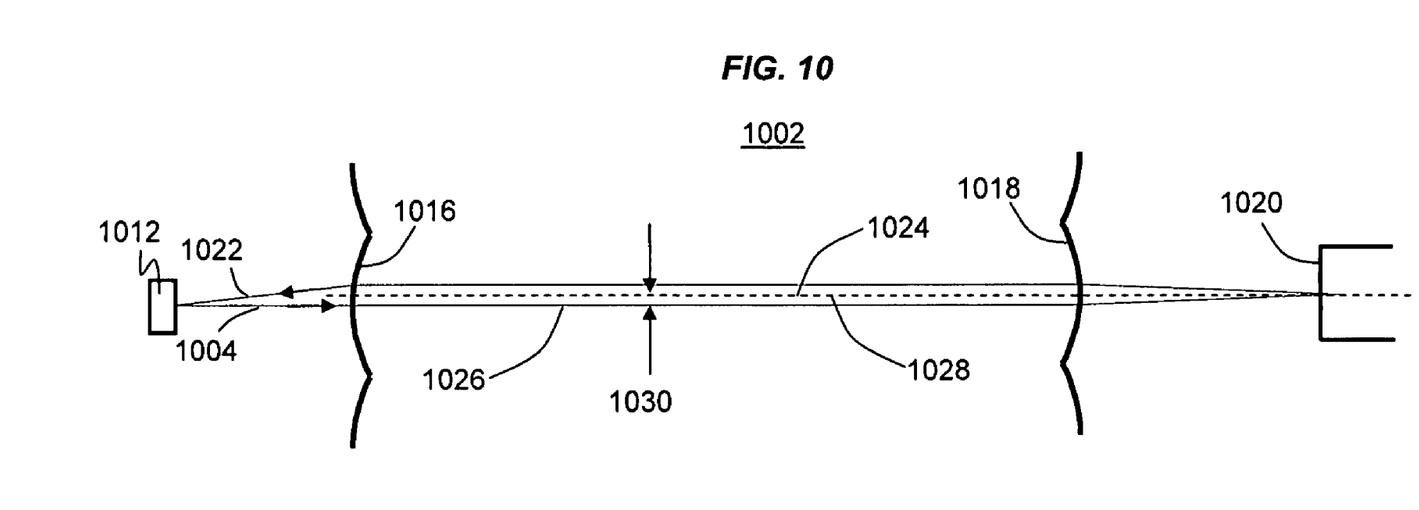
FIG. 10 is a schematic illustration of an optical system according to one embodiment of the present invention.

FIG. 10 illustrates a multi-channel optical system 1002 according to one embodiment of the present invention in which an emitted light beam 1004 from a VCSEL 1012 travels through proximal lens surface 1016 and a distal lens surface 1018 that focus emitted light beam 1004 on fiber 1020. A portion of the light of emitted light beam 1004 is reflected back as reflected light beam 1022 that travels through distal lens surface 1018 and proximal lens surface 1016 to become incident on VCSEL 1012. Fiber 1020 has a fiber axis 1024, proximal lens surface 1016 has a lens axis 1026, and distal lens surface 1018 has lens axis 1028. As can be seen in FIG. 10, lens axis 1026 is displaced from lens axis 1028 by a displacement 1030. In the example of FIG. 10, lens axis 1028 is approximately coincident with fiber axis 1024.

The proximal lens surface and distal lens surface of FIG. 10 may be a unibody device, or be constructed integrally, or be completely separate.

FIG. 10 shows how a displacement between the lens axes of a 2-lens surface optical system may be used to produce an angle of incidence of the reflected light beam onto the VCSEL. The effect is similar to tilting the VCSEL, but may be simpler to implement in manufacturing. In FIG. 10, only one channel of optical system 1002 is shown, with only portions of the lenses shown. To minimize aberrations for the beam incident on the fiber, the VCSEL and emitted light beam is aligned with the axis of the proximal lens surface, and the axis of the distal lens surface is aligned with the fiber axis. Optical system 1002 may alternatively or additionally have aberrations to focus a light beam similarly to the optical system shown in FIGS. 9A and 9B.

In one embodiment of the present invention, the intentional misalignment of the proximal and distal lens surfaces axes relative to each other provides a displacement or offset greater than the combined manufacturing tolerances of the proximal and distal lenses. Factors that affect manufacturing tolerances of the lenses include: expansion and/or contraction of the lenses or the various parts of the optical system, imperfections in the manufacturing of the lenses or other parts of the optical system, etc. In one embodiment the combined manufacturing tolerance for the lenses is 2 µm.

Figure 11A:
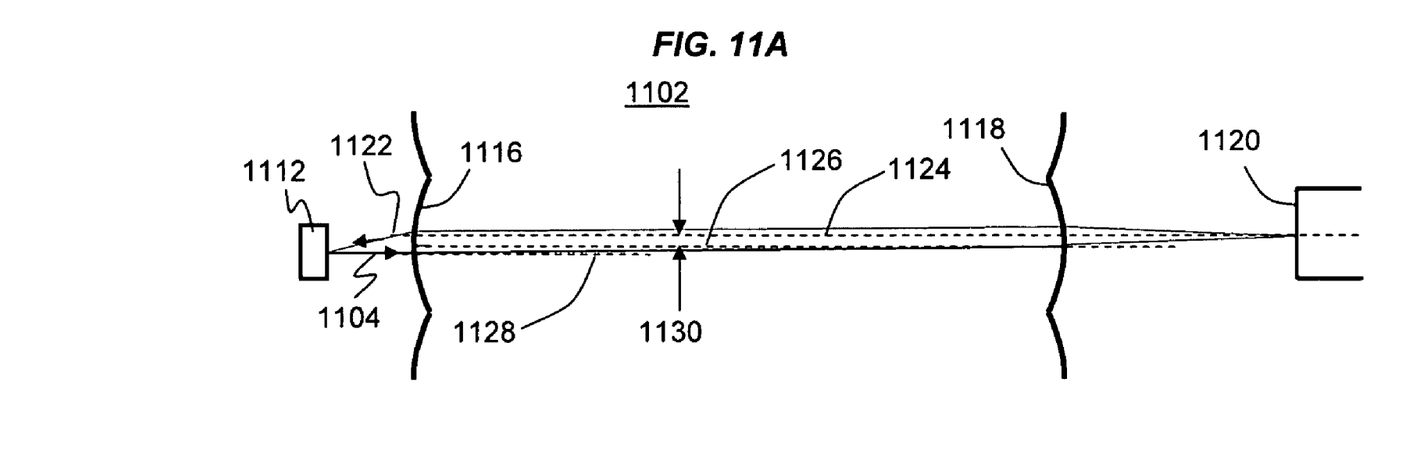
FIG. 11A is a schematic illustration of an optical system according to one embodiment of the present invention.
Figure 11B:
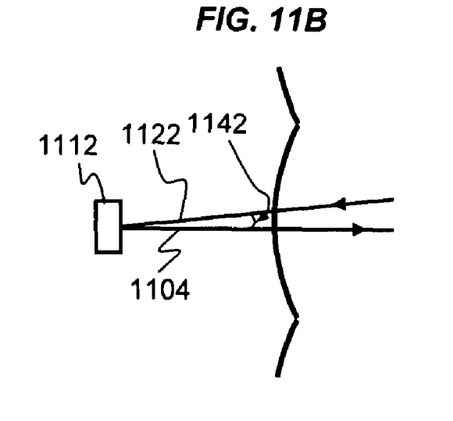
FIG. 11B is a close-up illustration of a portion of the optical system of FIG. 11A to better show the angle of incidence of the reflected beam on the VCSEL of the optical system.

FIGS. 11A and 11B illustrate a multi-channel optical system 1102 according to one embodiment of the present invention in which an emitted light beam 1104 from a VCSEL 1112 travels through proximal lens surface 1116 and a distal lens surface 1118 that focus emitted light beam 1104 on fiber 1120. A portion of the light of emitted light beam 1104 is reflected back as reflected light beam 1122 that travels through distal lens surface 1118 and proximal lens surface 1116 to become incident on VCSEL 1112. Fiber 1120 has a fiber axis 1124, proximal lens surface 1116 and distal lens surface 1118 have a common lens axis 1126, and VCSEL 1112 has a VCSEL axis 1128. As can be seen in FIG. 11A, lens axis 1126 is displaced from fiber axis 1122 by a displacement 1130. Displacement 1130, combined with the displacement of VCSEL axis 1128 from lens axis 1126, produces an angle of incidence 1142 of reflected light beam 1122 on VCSEL 1112.

In FIG. 11A, only one channel of optical system 1102 is shown, with only portions of the lenses shown. The proximal lens surface and distal lens surface of FIG. 11 may be a unibody device, or be constructed integrally, or be completely separate. Optical system 1102 may alternatively or additionally have aberrations to focus a light beam similarly to the optical system shown in FIGS. 9A and 9B.

Not shown in FIGS. 11A and 11B are alignment pins monolithically integrated with the lenses themselves or integrated within a lens array assembly for positioning a fiber array. Such alignment pins are used in the "MT ferrule," or similar connectors. Such alignment pins are usually well aligned with the lens arrays, and perfect alignment is sought.

Figure 12:
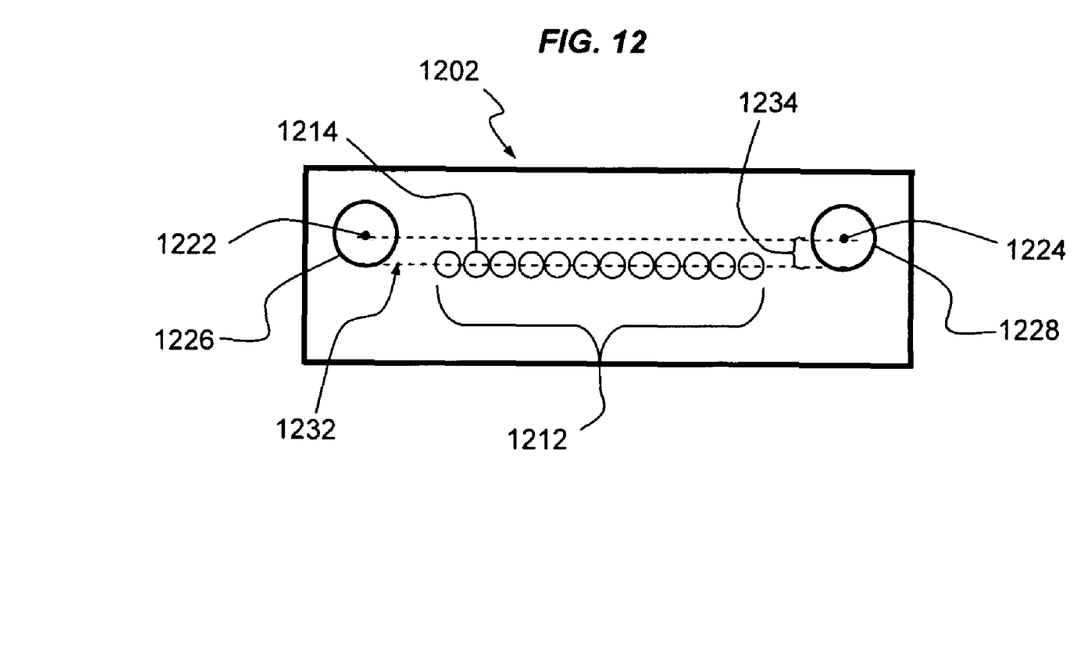
FIG. 12 is schematic illustration of a lens array of the present invention.

FIGS. 11A and 11B show that it is possible to produce an angle of incidence for the reflected light beam onto the VCSEL by laterally displacing the pins from the lens array, even if opposing lens surface axes are perfectly aligned. FIG. 12 shows a lens array 1202 including an array 1212 of lenses 1214. Pin centers 1222 and 1224 of respective alignment pins 1226 and 1228 are displaced vertically from lens array axis 1232 by a displacement 1234.

In one embodiment of the present invention, the intentional misalignment of the lens axis of the lens surfaces relative to the fiber axis provides a displacement or offset greater than the combined manufacturing tolerances of the lenses and the optical fiber. Factors that affect manufacturing tolerances of the lenses and optical fiber include: expansion and/or contraction of the lenses and/or optical fiber or the various parts of the optical system, imperfections in manufacturing of the lenses and/or optical fiber or other parts of the optical system, etc. In one embodiment the combined manufacturing tolerance for the lenses and the optical fiber is 2 µm.

EXAMPLE

Example

An optical system is made as shown in FIGS. 1A and 11B. An optical plastic material, tradenamed Ultem, is molded with the lens surfaces on either side. The thickness of the Ultem between the lens surfaces is 1.125 mm. For this system, a displacement of 13 µm between the surfaces produces a ~6° angle of incidence of the reflected light beam onto the VCSEL. A similar system may also be produced in glass or other optical material, for example by a wafer processing technique. Many alignment configurations are possible. For any lens fabrication technology, perfect alignment of the lens axes is usually sought, and accuracies of about 2 µm are often achieved. Therefore, an intentional misalignment of the lens surface axes that is greater than the manufacturing tolerance is typically greater than 2 µm.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A system comprising:
   one or more optical pathways, each optical pathway comprising:
   one or more laser sources for generating light;
   an input port for inputting the light;
   an integrally constructed lens having a proximal lens surface having a proximal axis, and
   a distal lens surface having a distal axis that is offset with respect to the proximal axis by a lateral distance; and
   an optical fiber having a fiber axis;
   wherein the lateral distance is such that coupling of light inputted into the input port and reflected from the optical fiber back into the input port is lessened compared with coupling of light back into the input port at a zero lateral distance between the proximal and the distal axes of the integrally constructed lens: and
   wherein in operation, the one or more of the laser sources emits a lowest-order mode and one or more higher-order modes, wherein the lowest-order mode and a higher-order mode are focused by the corresponding integrally constructed lens at least 50 µm apart from each other.

2. The system of claim 1, wherein the system comprises two or more optical pathways.

3. The system of claim 2, wherein the one or more laser sources comprises two or more VCSELs for emitting light through respective optical pathways of the two or more optical pathways.

4. The system of claim 1, further comprising a VCSEL having an optical axis, for emitting light through one of the optical pathways, wherein the VCSEL is coaxial with the corresponding proximal lens surface, and wherein the optical fiber is coaxial with the corresponding distal lens surface.

5. The system of claim 4, wherein the system comprises two or more optical pathways.

6. The system of claim 5, wherein in operation, the VCSEL emits a lowest-order mode and one or more higher-order modes, wherein the lowest-order mode and a higher-order mode are focused by the corresponding integrally constructed lens at least 20 µm apart from each other.

7. The system of claim 5, wherein in operation, the VCSEL emits a lowest-order mode and one or more higher-order modes, wherein the lowest-order mode and a higher-order mode are focused by the corresponding integrally constructed lens at least 50 µm apart from each other.

8. The system of claim 1, wherein the integrally constructed lens is a unibody lens.

9. A system comprising:
   two or more optical pathways, each optical pathway comprising:
   an integrally constructed lens having
      a proximal lens surface having a proximal axis, and
      a distal lens surface having a distal axis that is offset with respect to the proximal axis by a lateral distance; and
   an optical fiber having a fiber axis; and
   a VCSEL for emitting light through the corresponding optical pathway wherein in operation, the VCSEL emits a lowest-order mode and one or more higher-order modes, wherein the lowest-order mode and a higher-order mode focus at least 50 µm apart from each other; and
   wherein the lateral distance is such that light reflection from the optical fiber into the VCSEL is lessened compared with light reflection from the optical fiber into the VCSEL at a zero lateral distance between the proximal and the distal axes of the integrally constructed lens.

10. The system of claim 9, wherein the integrally constructed lens is a unibody lens.

11. A system comprising:
two or more optical pathways, each optical pathway comprising:
an integrally constructed lens having
a proximal lens surface having a proximal axis,
a distal lens surface having a distal axis that is offset by a lateral distance greater than 2 μm with respect to the proximal axis, and
an optical fiber receptacle having a fiber axis; and
a VCSEL for emitting light through the corresponding optical pathway,
wherein in operation, the VCSEL emits a lowest-order mode and one or more higher-order modes, wherein the lowest-order mode and a higher-order mode are focused by the integrally constructed lens at least 50 μm apart from each other.

12. The system of claim 11, wherein the integrally constructed lens is a unibody lens.

13. A system comprising:
two or more optical pathways, each optical pathway comprising:
an integrally constructed lens having
a proximal lens surface having a proximal axis, and
a distal lens surface having a distal axis;
an optical fiber having a fiber axis that is offset with respect to the proximal axis by a lateral distance of at least 2 μm; and
a VCSEL for emitting light through the corresponding optical pathway, wherein in operation, the VCSEL emits a lowest-order mode and one or more higher-order modes, wherein the lowest-order mode and a higher-order mode are focused by the integrally constructed lens at least 50 μm apart from each other.

14. The system of claim 13, wherein the integrally constructed lens is a unibody lens.

15. A system comprising:
two or more optical pathways, each optical pathway comprising:
an integrally constructed lens having
a proximal lens surface having a proximal axis,
a distal lens surface having a distal axis, and
an optical fiber receptacle having a fiber axis that is offset by a lateral distance greater than 2 μm with respect to the proximal axis; and
a VCSEL for emitting light through the corresponding optical pathway,
wherein in operation, the VCSEL emits a lowest-order mode and one or more higher-order modes, wherein the lowest-order mode and a higher-order mode are focused by the integrally constructed lens at least 50 μm apart from each other.

16. The system of claim 15, wherein the integrally constructed lens is a unibody lens.

\* \* \* \* \*